United States Patent
Iyori et al.

(10) Patent No.: US 8,852,769 B2
(45) Date of Patent: Oct. 7, 2014

(54) NONAQUEOUS ELECTROLYTE SECONDARY BATTERY AND METHOD FOR MANUFACTURING THE SAME

(75) Inventors: Masahiro Iyori, Hirakata (JP); Hirofusa Tanaka, Kasai (JP); Naoki Terada, Kakogawa (JP); Seiji Omura, Kobe (JP); Yasuhiro Yamauchi, Sumoto (JP); Toshiyuki Nohma, Kobe (JP); Masahide Miyake, Kobe (JP); Yasuyuki Kusumoto, Kobe (JP); Shigeki Matsuta, Kobe (JP); Toyoki Fujihara, Kanzaki (JP); Takeshi Yoshida, Takasago (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 151 days.

(21) Appl. No.: 13/279,452

(22) Filed: Oct. 24, 2011

(65) Prior Publication Data

US 2012/0107652 A1    May 3, 2012

(30) Foreign Application Priority Data

Oct. 28, 2010 (JP) ................... 2010-241869
Sep. 8, 2011 (JP) ................... 2011-195893

(51) Int. Cl.
| | |
|---|---|
| *H01M 2/00* | (2006.01) |
| *H01M 2/26* | (2006.01) |
| *H01M 10/42* | (2006.01) |
| *H01M 10/04* | (2006.01) |
| *H01M 2/34* | (2006.01) |
| *H01M 10/052* | (2010.01) |
| *H01M 10/0587* | (2010.01) |

(52) U.S. Cl.
CPC ............ *H01M 2/263* (2013.01); *H01M 10/052* (2013.01); *Y02E 60/12* (2013.01); *Y02T 10/7011* (2013.01); *H01M 2200/20* (2013.01); *H01M 10/4235* (2013.01); *H01M 10/0431* (2013.01); *H01M 2/345* (2013.01); *H01M 10/0587* (2013.01)
USPC ............. 429/61; 429/237; 429/199; 429/188; 429/218.1; 29/623.5; 29/623.1

(58) Field of Classification Search
USPC ......... 429/61, 327, 199, 188, 218.1; 29/623.5, 29/623.1
See application file for complete search history.

(56) References Cited

U.S. PATENT DOCUMENTS

| | | | |
|---|---|---|---|
| 2008/0182175 A1* | 7/2008 | Okazaki et al. | 429/330 |
| 2009/0246605 A1* | 10/2009 | Chang et al. | 429/54 |
| 2010/0209746 A1* | 8/2010 | Kiyama | 429/56 |
| 2011/0027650 A1* | 2/2011 | Yamamoto et al. | 429/218.1 |

FOREIGN PATENT DOCUMENTS

| | | |
|---|---|---|
| JP | 2001-015155 A | 1/2001 |
| JP | 2004-134261 A | 4/2004 |

* cited by examiner

*Primary Examiner* — Patrick Ryan
*Assistant Examiner* — Alex Usyatinsky
(74) *Attorney, Agent, or Firm* — Westerman, Hattori, Daniels & Adrian, LLP (57) ABSTRACT

A nonaqueous secondary battery includes a current cutoff mechanism that cuts off a current in a short period of time in response to a rise in pressure inside a battery outer body in at least one of a conductive path through which a current is taken out from a positive electrode plate to outside of the battery and a conductive path through which a current is taken out from a negative electrode plate to outside of the battery. At least one type selected from an oligomer containing a cyclohexyl group and a phenyl group, a modified product of the oligomer containing a cyclohexyl group and a phenyl group, a polymer containing a cyclohexyl group and a phenyl group, and a modified product of the polymer containing a cyclohexyl group and a phenyl group is present on the surface of the positive electrode plate.

2 Claims, 3 Drawing Sheets

FIG.3

NONAQUEOUS ELECTROLYTE SECONDARY BATTERY AND METHOD FOR MANUFACTURING THE SAME

TECHNICAL FIELD

The present invention relates to a nonaqueous electrolyte secondary battery provided with a pressure-sensitive current cutoff mechanism, and to a method for manufacturing the nonaqueous electrolyte secondary battery.

BACKGROUND ART

In recent years, many nonaqueous electrolyte secondary batteries typified by a lithium-ion secondary battery are used as a power source for driving portable electronic devices such as mobile phones, portable personal computers, and portable music players. In addition, emission controls regarding carbon dioxide and the like have been intensified against a backdrop of growing awareness of the need to protect the environment. Therefore, the automotive industry is actively developing not only automobiles using fossil fuels such as gasoline, diesel oil, or natural gas, but also electric vehicles (EV) and hybrid electric vehicles (HEV) that use lithium-ion secondary batteries.

Such lithium-ion secondary batteries use, as a negative electrode active material, a carbon-based material or the like capable of absorbing and desorbing lithium ions, and as a positive electrode active material, a lithium-transition metal composite oxide such as $LiCoO_2$, $LiNiO_2$, or $LiMn_2O_4$, and also use an electrolyte that is a solution of a lithium salt dissolved into an organic solvent.

If such a lithium-ion secondary battery is overcharged, an excessive amount of lithium is extracted from a positive electrode and inserted into a negative electrode, and thus, both the positive and negative electrodes are thermally destabilized. The thermal destabilization of both the positive and negative electrodes has an effect of decomposing the organic solvent in the electrolyte over time. Thus, there has been a problem that a rapid exothermic reaction occurs to cause the battery to generate an abnormal amount of heat, resulting in compromising the safety of the battery.

In order to resolve such a problem, a lithium-ion secondary battery has been proposed in which, for example, at least one additive, including biphenyl, cyclohexylbenzene, and diphenyl ether, is added to the electrolyte so as to prevent the temperature from rising when the battery is overcharged (refer to JP-A-2004-134261).

In addition, a lithium-ion secondary battery has been proposed in which the organic solvent of the electrolyte contains an alkylbenzene derivative or cycloalkylbenzene derivative having a tertiary carbon adjacent to a phenyl group so as to ensure safety against overcharging without adversely affecting battery characteristics such as low-temperature characteristics and preservation characteristics (refer to JP-A-2001-015155).

In this lithium-ion secondary battery, when the lithium-ion secondary battery is overcharged, additives, such as cumene, 1,3-diisopropylbenzene, 1,4-diisopropylbenzene, 1-methylpropylbenzene, 1,3-bis(1-methylpropyl)benzene, 1,4-bis(1-methylpropyl)benzene, cyclohexylbenzene, and cyclopentylbenzene, start a decomposition reaction to produce gas, and at the same time, start a polymerization reaction to generate polymerization heat. If the battery continues to be overcharged in this state, the produced amount of gas increases, and then, after 15 to 19 minutes has passed from the start of the overcharge, a current cutting-off sealing plate operates to cut off the overcharging current. As a result, the battery temperature gradually drops.

A non-patent document, "K. Shima et al./Journal of Power Sources 161 (2006) P 1264-1274", discloses that when a lithium-ion secondary battery containing cyclohexylbenzene in the electrolyte thereof has been overcharged, the cyclohexylbenzene contained in the electrolyte changes to biphenyl, an oligomer of cyclohexylbenzene, or a polymer of cyclohexylbenzene. The non-patent document also discloses that further progress of the reaction forms cross-links between them to produce a modified product of the cyclohexylbenzene.

By incorporating into the electrolyte additives such as cyclohexylbenzene disclosed in JP-A-2001-015155 mentioned above, when a battery has been overcharged, a decomposition reaction of the additives can produce gas to operate a pressure-sensitive current cutoff mechanism, and thus, the safety of the battery can be improved. However, a certain period of time is required from when the battery is in the overcharged state until the pressure-sensitive current cutoff mechanism operates. In addition, depending on the status of battery use, the operation of the current cutoff mechanism may be delayed, for example, when the battery is used under a low-temperature condition. For this reason, the battery temperature can rapidly rise during the period before the current cutoff mechanism operates, thereby causing a film of a separator to melt to break. Thus, a positive electrode plate can be shorted with a negative electrode plate, leading to a thermal runaway.

SUMMARY

An advantage of some aspects of the invention is to provide a nonaqueous electrolyte secondary battery with excellent safety that is capable of operating a pressure-sensitive current cutoff mechanism in a short period of time when the battery has been overcharged, and to provide a method for manufacturing the nonaqueous electrolyte secondary battery.

A nonaqueous electrolyte secondary battery according to a first aspect of the present invention includes an electrode assembly including a positive electrode plate, a negative electrode plate, and a separator interposed between the positive electrode plate and the negative electrode plate, an outer body housing the electrode assembly and a nonaqueous electrolyte, and a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery. In the nonaqueous electrolyte secondary battery according to the first aspect of the invention, at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group is present on the surface of the positive electrode plate.

The nonaqueous electrolyte secondary battery according to the first aspect of the invention serves as a nonaqueous electrolyte secondary battery with high safety that is capable of operating the pressure-sensitive current cutoff mechanism in a short period of time when the battery has been overcharged.

When the nonaqueous electrolyte secondary battery containing cyclohexylbenzene in the electrolyte thereof has been overcharged, the cyclohexylbenzene uniformly distributed in the electrolyte is considered to gradually oxidize and decompose on the surface of the positive electrode plate, thereby producing gas. Thus, a certain period of time is required until the required amount of gas is produced for operating the current cutoff mechanism. Therefore, the current cutoff mechanism does not operate immediately after the battery has been overcharged.

On the other hand, on the surface of the positive electrode plate of the nonaqueous electrolyte secondary battery according to the first aspect of the invention, at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group is present as a substance having a function of producing gas in the overcharged state. Therefore, when the battery has been overcharged, at least one type selected from the oligomer of the compound containing a cyclohexyl group and a phenyl group, the polymer of the compound containing a cyclohexyl group and a phenyl group, the modified product of the oligomer of the compound containing a cyclohexyl group and a phenyl group, and the modified product of the polymer of the compound containing a cyclohexyl group and a phenyl group can be oxidized to be decomposed to produce the required amount of gas for operating the current cutoff mechanism in a short period of time.

Examples of the compound containing a cyclohexyl group and a phenyl group are cyclohexylbenzene, 4'-cyclohexylacetophenone, dicyclohexylbenzene, and 1-bromo-4-cyclohexylbenzene. The oligomer of the compound containing a cyclohexyl group and a phenyl group and the polymer of the compound containing a cyclohexyl group and a phenyl group are polymeric substances formed by polymerizing a plurality of such compounds (monomers) into an oligomer and a polymer, respectively.

Unlike the oligomer and the polymer described above, the modified product of the oligomer of the compound containing a cyclohexyl group and a phenyl group, and the modified product of the polymer of the compound containing a cyclohexyl group and a phenyl group are macromolecules formed by cross-linking a plurality of monomers, oligomers, and polymers. When formed by reaction in the nonaqueous electrolyte, these modified products may have, in addition to the cyclohexyl group and the phenyl group, other functional groups.

The above-described compounds have a cyclohexyl group and a phenyl group. Therefore, when the battery has been overcharged, the cyclohexyl group is formed into an oxidized phenyl group to produce hydrogen gas, and further, the phenyl group is oxidized to be decomposed to produce hydrogen gas.

It is particularly preferable that the compound that is present on the surface of the positive electrode plate be selected from one of an oligomer of cyclohexylbenzene, a polymer of cyclohexylbenzene, a modified product of the oligomer of cyclohexylbenzene, and a modified product of the polymer of cyclohexylbenzene.

Here, unlike the oligomer and the polymer described above, the modified product of the oligomer of cyclohexylbenzene and the modified product of the polymer of cyclohexylbenzene are macromolecules formed by cross-linking a plurality of monomers, oligomers, and polymers. When formed by reaction in the nonaqueous electrolyte, these modified products may have, in addition to a cyclohexyl group and a phenyl group, other functional groups.

In the nonaqueous electrolyte secondary battery according to the first aspect of the invention, it is sufficient that at least one type selected from the oligomer of the compound containing a cyclohexyl group and a phenyl group, the polymer of the compound containing a cyclohexyl group and a phenyl group, the modified product of the oligomer of the compound containing a cyclohexyl group and a phenyl group, and the modified product of the polymer of the compound containing a cyclohexyl group and a phenyl group be present on the surface of the positive electrode plate. A plurality of such types may also be present on the surface of the positive electrode plate.

In the nonaqueous electrolyte secondary battery according to the first aspect of the invention, it is preferable that the current cutoff mechanism operate at a pressure of 0.4 MPa to 1.5 MPa, and the time required for the operation of the current cutoff mechanism be within 1000 seconds from a start of a constant current charge of 4 C that is performed under an environment of −10° C. after a battery voltage is set to 4.1 V and a battery temperature is set to −10° C.

By employing the structure as described above, the nonaqueous electrolyte secondary battery serves as a nonaqueous electrolyte secondary battery with higher safety in the overcharged state. In addition, it is more preferable that the current cutoff mechanism operate at a pressure of 0.4 MPa to 1.0 MPa, and the time required for the operation of the current cutoff mechanism be within 900 seconds from the start of the constant current charge of 4 C that is performed under the environment of −10° C. after the battery voltage is set to 4.1 V and the battery temperature is set to −10° C.

In the nonaqueous electrolyte secondary battery according to the first aspect of the invention, it is preferable that a total amount of the oligomer of the compound containing a cyclohexyl group and a phenyl group, the polymer of the compound containing a cyclohexyl group and a phenyl group, the modified product of the oligomer of the compound containing a cyclohexyl group and a phenyl group, and the modified product of the polymer of the compound containing a cyclohexyl group and a phenyl group be 0.05 percent or more by mass relative to the total mass of the nonaqueous electrolyte based on the monomer of cyclohexylbenzene.

In the case that the total amount of the oligomer of the compound containing a cyclohexyl group and a phenyl group, the polymer of the compound containing a cyclohexyl group and a phenyl group, the modified product of the oligomer of the compound containing a cyclohexyl group and a phenyl group, and the modified product of the polymer of the compound containing a cyclohexyl group and a phenyl group is 0.05 percent or more by mass relative to the total mass of the nonaqueous electrolyte based on the monomer of cyclohexylbenzene, the current cutoff mechanism can be operated more reliably in a short period of time when the nonaqueous electrolyte secondary battery has been overcharged.

In the nonaqueous electrolyte secondary battery according to the first aspect of the invention, it is preferable that the electrolyte contain cyclohexylbenzene.

With the cyclohexylbenzene contained in the electrolyte, when the battery has been overcharged, not only the substances present on the surface of the positive electrode plate, that is, the oligomer of the compound containing a cyclohexyl group and a phenyl group, the polymer of the compound containing a cyclohexyl group and a phenyl group, the modified product of the oligomer of the compound containing a cyclohexyl group and a phenyl group, and the modified product of the polymer of the compound containing a cyclohexyl group and a phenyl group, but also the cyclohexylbenzene present in the vicinity of the positive electrode plate is decomposed by oxidation reaction to produce gas. Therefore, a greater amount of gas can be produced in a short period of time. The amount of cyclohexylbenzene contained in the electrolyte is preferably in the range of 0.05 to 2.0 percent by mass relative to the total mass of the electrolyte.

According to a second aspect of the invention, a method for manufacturing a nonaqueous electrolyte secondary battery including an electrode assembly including a positive electrode plate, a negative electrode plate, and a separator interposed between the positive electrode plate and the negative electrode plate, an outer body housing the electrode assembly and a nonaqueous electrolyte, and a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery, includes forming, on the surface of the positive electrode plate, at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group.

It is preferable that the forming of at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group on the surface of the positive electrode plate be performed after the electrode assembly is disposed in the nonaqueous electrolyte containing a compound containing a cyclohexyl group and a phenyl group.

The electrode assembly is disposed in the nonaqueous electrolyte containing a compound containing a cyclohexyl group and a phenyl group, and thereafter at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group is formed on the surface of the positive electrode plate. Accordingly, it is possible to easily obtain a nonaqueous electrolyte secondary battery with higher safety that is capable of operating the pressure-sensitive current cutoff mechanism in a short period of time when the battery has been overcharged.

In order to form, on the surface of the positive electrode plate, at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group, it is effective to perform a charging process after disposing the electrode assembly in an electrolyte containing a substance such as cyclohexylbenzene, 4'-cyclohexylacetophenone, dicyclohexylbenzene, or 1-bromo-4-cyclohexylbenzene.

In the method for manufacturing a nonaqueous electrolyte secondary battery according to the second aspect of the invention, it is preferable that after the electrode assembly is disposed in the nonaqueous electrolyte containing cyclohexylbenzene, at least one type selected from an oligomer of cyclohexylbenzene, a polymer of cyclohexylbenzene, a modified product of the oligomer of cyclohexylbenzene, and a modified product of the polymer of cyclohexylbenzene is formed on the surface of the positive electrode plate.

The charging process for forming, on the surface of the positive electrode plate, at least one type selected from an oligomer of cyclohexylbenzene, a polymer of cyclohexylbenzene, a modified product of the oligomer of cyclohexylbenzene, and a modified product of the polymer of cyclohexylbenzene needs to be performed at a certain temperature or more and at a certain voltage or more. In this charging process, the processing voltage can be set to a lower value when the processing temperature is set to a higher value. On the other hand, the processing temperature can be set to a lower value when the processing voltage is set to a higher value. The processing time can also be adjusted to an appropriate value depending on the processing voltage and the processing temperature.

It is preferable that settings be adjusted so that the current cutoff mechanism in the nonaqueous electrolyte secondary battery operates at a pressure of 0.4 MPa to 1.5 MPa, and so that the time required for the operation of the current cutoff mechanism is within 1000 seconds from a start of a constant current charge of 4 C that is performed under an environment of $-10°$ C. after the nonaqueous electrolyte secondary battery is set to a battery voltage of 4.1 V and a battery temperature of $-10°$ C. after being charged.

In order to form the oligomer of cyclohexylbenzene or the modified product thereof, or the polymer of cyclohexylbenzene or the modified product thereof on the surface of the positive electrode plate, the charging process needs to be performed at a certain temperature or more and at a certain voltage or more. Accordingly, it is preferable to first dispose the electrode assembly in the nonaqueous electrolyte containing cyclohexylbenzene, and then, perform the charging process for 15 minutes or more under charging conditions of 40° C. or more and 4.2 V or more. It is more preferable to perform the charging process for 30 minutes or more under the charging conditions of 40° C. or more and 4.2 V or more.

It is also preferable to perform the charging process under charging conditions of 40° C. or more and 4.3 V or more, and more preferable to perform the charging process for 30 minutes or more under the charging conditions of 40° C. or more and 4.3 V or more. It is further more preferable to perform the charging process for 3 hours or more under the charging conditions of 40° C. or more and 4.3 V or more.

The above-described charging process is preferably performed at a voltage lower than 4.5 V and at a temperature of 70° C. or less. The processing time is, although not particularly limited, preferably within 5 hours to minimize a burden on the battery.

Note that the charging process is preferably performed with an amount of the compound containing a cyclohexyl group and a phenyl group contained in the electrolyte at 0.1 to 0.4 percent by mass relative to the total mass of the electrolyte.

The charging process can be performed in the electrolyte containing the compound containing a cyclohexyl group and a phenyl group before the electrode assembly is inserted in the outer body. However, the charging process is preferably performed at a high temperature after the electrode assembly and the nonaqueous electrolyte containing the compound containing a cyclohexyl group and a phenyl group are housed in the outer body.

A nonaqueous electrolyte secondary battery according to a third aspect of the invention includes an electrode assembly including a positive electrode plate, a negative electrode plate, and a separator interposed between the positive electrode plate and the negative electrode plate, an outer body housing the electrode assembly and a nonaqueous electrolyte, and a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery. In the nonaqueous electrolyte secondary battery according to the third aspect of the invention, the nonaqueous electrolyte contains a compound containing a cyclohexyl group and a phenyl group, and a concentration of the compound in the nonaqueous electrolyte is higher in the vicinity of the surface of the positive electrode plate than in other areas.

With the structure described above, the concentration of the compound containing a cyclohexyl group and a phenyl group present in the nonaqueous electrolyte can be made high in the vicinity of the surface of the positive electrode plate, without increasing the total amount of the compound containing a cyclohexyl group and a phenyl group contained in the electrolyte. As a result, when the battery has been overcharged, the required amount of gas for operating the current cutoff mechanism can be produced in a short period of time. If the amount of the compound containing a cyclohexyl group and a phenyl group contained in the electrolyte is increased, battery characteristics such as cycle characteristics may be degraded. The structure described above excels in the respect that, when the battery has been overcharged, the required amount of gas for operating the current cutoff mechanism can be produced in a short period of time without increasing the amount of the compound containing a cyclohexyl group and a phenyl group contained in the electrolyte.

Examples of the compound containing a cyclohexyl group and a phenyl group are cyclohexylbenzene, 4'-cyclohexylacetophenone, dicyclohexylbenzene, and 1-bromo-4-cyclohexylbenzene. Cyclohexylbenzene is particularly preferable among these examples.

In the nonaqueous electrolyte secondary battery according to the third aspect of the invention, it is preferable that the current cutoff mechanism operate at a pressure of 0.4 MPa to 1.5 MPa, and the time required for the operation of the current cutoff mechanism be within 1100 seconds from a start of a constant current charge of 4 C that is performed under an environment of −10° C. after the battery voltage is set to 4.1 V and the battery temperature is set to −10° C.

By employing the structure as described above, the nonaqueous electrolyte secondary battery serves as a nonaqueous electrolyte secondary battery with higher safety in the overcharged state. In addition, it is more preferable that the current cutoff mechanism operate at a pressure of 0.4 MPa to 1.0 MPa, and the time required for the operation of the current cutoff mechanism be within 1000 seconds from the start of the constant current charge of 4 C that is performed under the environment of −10° C. after the battery voltage is set to 4.1 V and the battery temperature is set to −10° C.

In the nonaqueous electrolyte secondary battery according to the third aspect of the invention, it is preferable that at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group be present on the surface of the positive electrode plate.

As a result, when the battery has been overcharged, the required amount of gas for operating the current cutoff mechanism can be produced in a shorter period of time.

According to a fourth aspect of the invention, a method for manufacturing a nonaqueous electrolyte secondary battery including an electrode assembly including a positive electrode plate, a negative electrode plate, and a separator interposed between the positive electrode plate and the negative electrode plate, an outer body housing the electrode assembly and a nonaqueous electrolyte, and a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery, includes, after the nonaqueous electrolyte containing a compound containing a cyclohexyl group and a phenyl group is housed in the outer body together with the electrode assembly, a charging process in which a concentration of the compound in the nonaqueous electrolyte is made higher in the vicinity of the surface of the positive electrode plate than in other areas.

By the method described above, the concentration of the compound containing a cyclohexyl group and a phenyl group present in the nonaqueous electrolyte can be made high in the vicinity of the surface of the positive electrode plate, without increasing the total amount of the compound containing a cyclohexyl group and a phenyl group contained in the electrolyte. As a result, it is possible to obtain a nonaqueous electrolyte secondary battery that is capable of producing the required amount of gas for operating the current cutoff mechanism in a short period of time when the battery has been overcharged.

Examples of the compound containing a cyclohexyl group and a phenyl group are cyclohexylbenzene, 4'-cyclohexylacetophenone, dicyclohexylbenzene, and 1-bromo-4-cyclohexylbenzene. Cyclohexylbenzene is particularly preferable among these examples.

In order to achieve the state in which the concentration of the compound containing a cyclohexyl group and a phenyl group present in the nonaqueous electrolyte is higher in the vicinity of the surface of the positive electrode plate than in other areas, the charging process needs to be performed at a certain temperature or more and at a certain voltage or more. In this charging process, the processing voltage can be set to a lower value when the processing temperature is set to a higher value. On the other hand, the processing temperature can be set to a lower value when the processing voltage is set to a higher value. The processing time can also be adjusted to an appropriate value depending on the processing voltage and the processing temperature.

It is preferable that settings be adjusted so that the current cutoff mechanism in the nonaqueous electrolyte secondary battery operates at a pressure of 0.4 MPa to 1.5 MPa, and so that the time required for the operation of the current cutoff mechanism is within 1100 seconds from a start of a constant current charge of 4 C that is performed under an environment of −10° C. after the nonaqueous electrolyte secondary battery is set to a battery voltage of 4.1 V and a battery temperature of −10° C. after being charged.

The above-described charging process is preferably performed under charging conditions of 70° C. or more and 3.75 V or more, where the longer the time of the charging process, the larger the effect thereof. The time of the charging process is preferably 22 hours or more.

The charging process is also preferably performed under charging conditions of 75° C. or more and 4.00 V or more, where the time of the charging process is preferably 18 hours or more.

The charging process is also preferably performed under charging conditions of 80° C. or more and 3.90 V or more, where the time of the charging process is preferably 20 hours or more.

The charging process is also preferably performed under charging conditions of 80° C. or more and 4.00 V or more, where the time of the charging process is preferably 15 hours or more.

In order to suppress the battery characteristics from degrading in the charging process, the processing temperature is preferably 85° C. or less, and the processing voltage is preferably less than 4.5 V and more preferably 4.3 V or less.

Note that the charging process is preferably performed with an amount of the compound containing a cyclohexyl group and a phenyl group contained in the electrolyte at 0.1 to 0.4 percent by mass relative to the total mass of the electrolyte.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below. However, it should be understood that the embodiment below is intended by way of an illustrative example of a prismatic lithium-ion secondary battery as a nonaqueous electrolyte secondary battery that carries out the technical concepts of the invention, and is not intended by way of limiting the invention to this prismatic lithium-ion secondary battery. The invention could equally well be applied to yield other embodiments of the nonaqueous electrolyte secondary battery within the scope and spirit of the claims.

Figure 1:
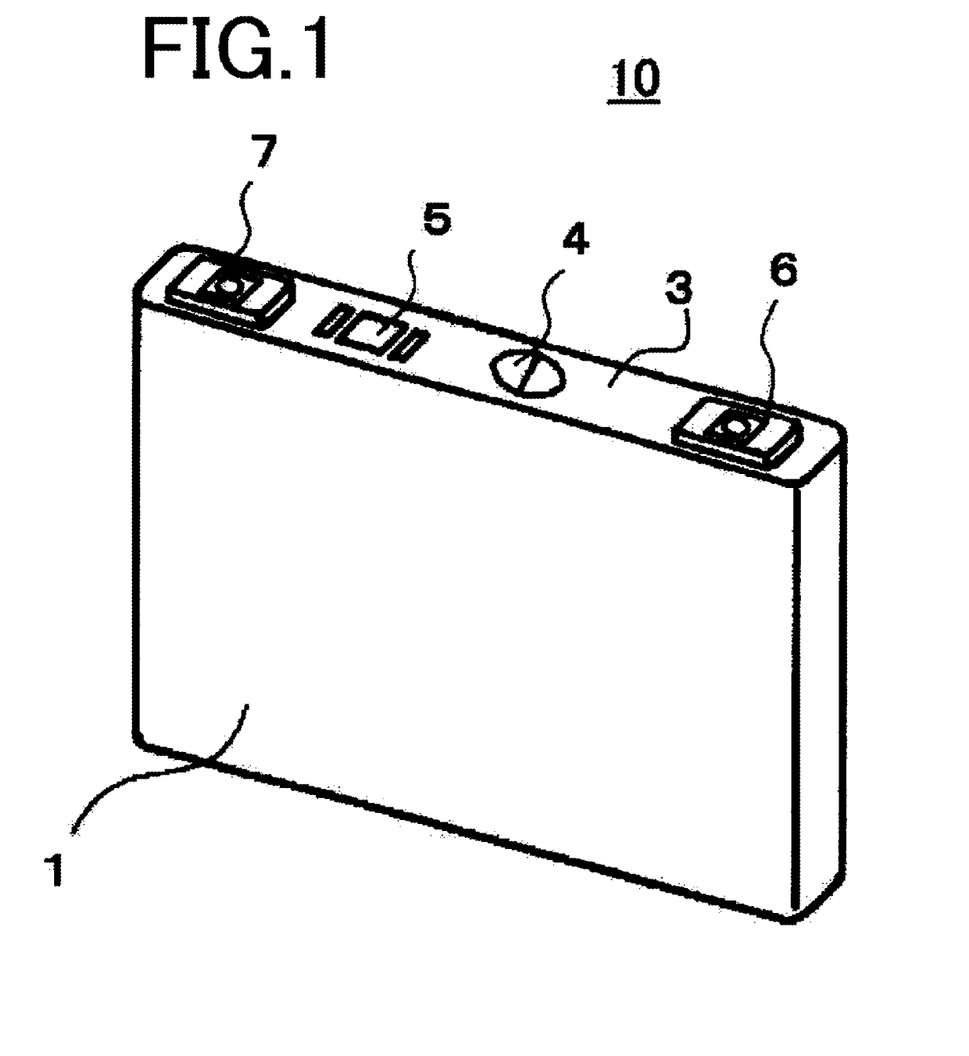
FIG. 1 is a perspective view showing a prismatic lithium-ion secondary battery according to an embodiment of the invention.
Figure 2:
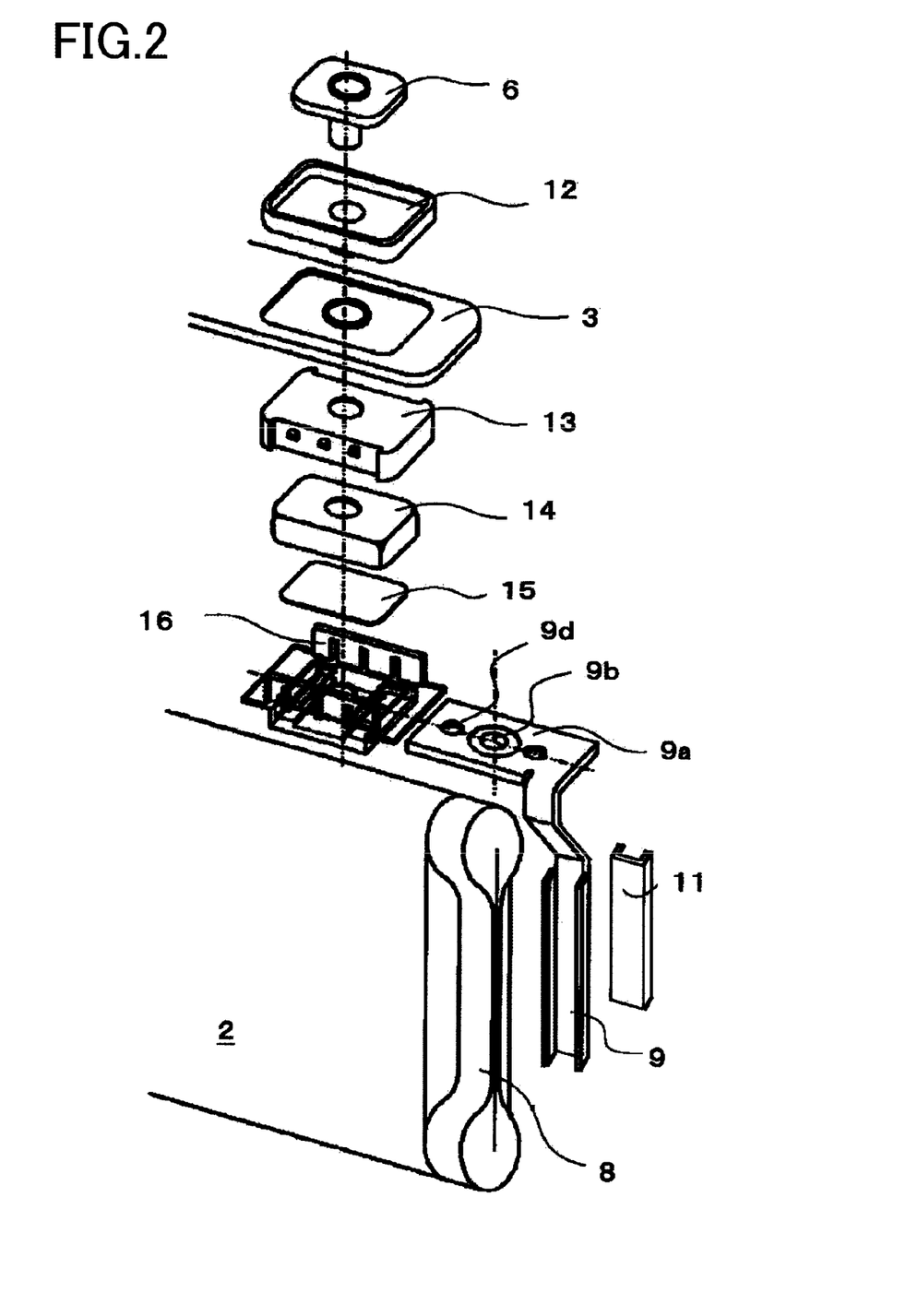
FIG. 2 is an exploded perspective view showing a positive electrode side conductive path of the prismatic lithium-ion secondary battery shown in FIG. 1.
Figure 3:
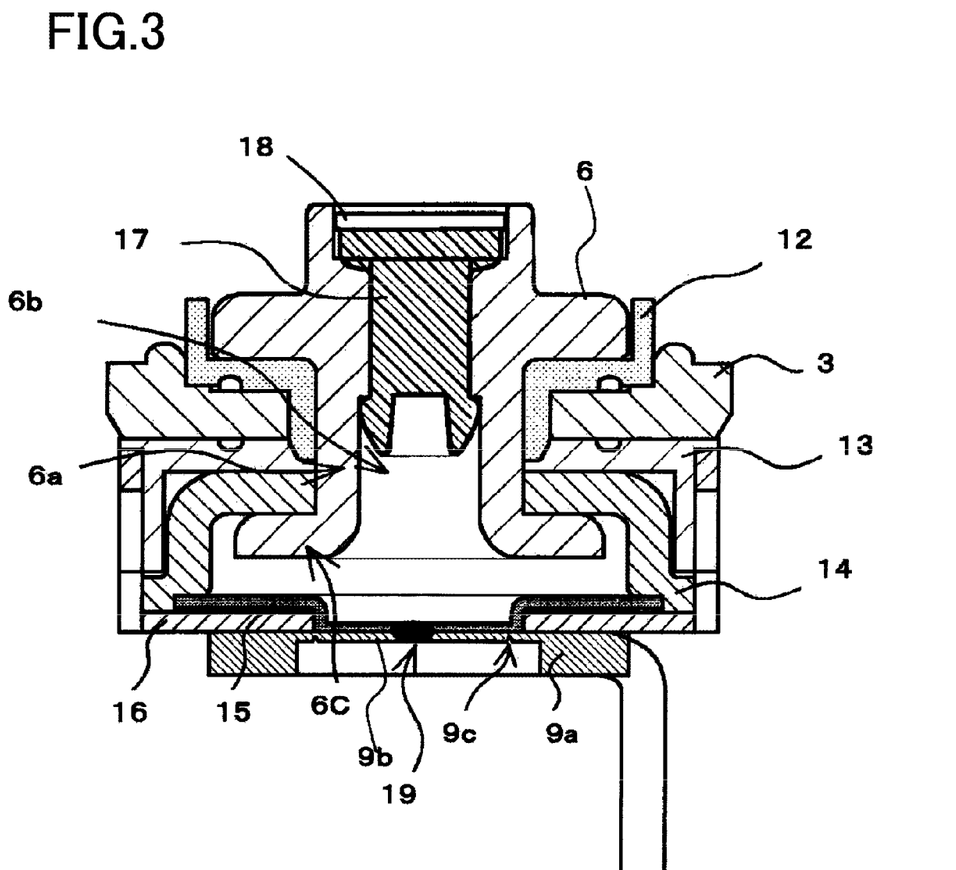
FIG. 3 is a cross-sectional view showing the positive electrode side conductive path of the prismatic lithium-ion secondary battery shown in FIG. 1.

First of all, a structure of a prismatic lithium-ion secondary battery 10 according to the embodiment will be described using FIGS. 1 to 3. In the prismatic lithium-ion secondary battery 10, as shown in FIG. 1, an electrode assembly 2 (FIG. 2) in which a positive electrode plate and a negative electrode plate are stacked with a separator interposed therebetween and the stack is wound so as to form the electrode assembly 2 into a flat shape is housed in an outer can 1 in a transverse direction with respect to the axis of the outer can 1; and, a sealing plate 3 seals a mouth of the outer can 1. The sealing plate 3 is equipped with a gas exhaust valve 4, an electrolyte pour hole (not shown), and a sealing member 5 that seals the electrolyte pour hole. The gas exhaust valve 4 breaks when subjected to a gas pressure higher than an operating pressure of a current cutoff mechanism so as to exhaust the gas out of the battery.

The sealing plate 3 is provided, on the outer surface thereof, with a positive electrode external terminal 6 and a negative electrode external terminal 7. The positive electrode external terminal 6 and the negative electrode external terminal 7 can have different shapes appropriately depending on whether the lithium-ion secondary battery is used alone, in series connection, or in parallel connection. The positive electrode external terminal 6 and the negative electrode external terminal 7 can also be used with terminal plates, bolt-shaped external connection terminals, or the like (not shown) attached thereto.

Next, a structure of a current cutoff mechanism provided in the prismatic lithium-ion secondary battery 10 will be described using FIGS. 2 and 3. FIGS. 2 and 3 are an exploded perspective view and a cross-sectional view, respectively, showing a positive electrode side conductive path. A collector 9 and an electrode collector receiving part 11 are connected to both external surfaces of a positive electrode substrate exposed portion 8 projecting from one end of the electrode assembly 2. The positive electrode external terminal 6 has a tubular portion 6a formed with a through-hole 6b therein. The tubular portion 6a of the positive electrode external terminal 6 is inserted in through-holes respectively provided in a gasket 12, the sealing plate 3, an insulating member 13, and a cup-shaped conductive member 14, and a leading end portion 6c of the positive electrode external terminal 6 is crimped to be fixed integrally therewith.

An inversion plate 15 is welded, along a circumference thereof, to a peripheral edge portion of the conductive member 14. A thin-walled portion 9b provided at a tab portion 9a of the collector 9 is laser-welded to a central part of the inversion plate 15 to form a welded portion 19. The thin-walled portion 9b provided at the tab portion 9a of the collector 9 is formed with an annular groove 9c around the welded portion 19. A collector tab holder 16 made of resin is disposed at peripheral parts of the tab portion 9a of the collector 9 and the inversion plate 15 in order to position the tab portion 9a of the collector 9 and the inversion plate 15 and to electrically insulate the peripheral parts thereof. With the above-described structure, the positive electrode substrate exposed portion 8 is electrically connected to the positive electrode external terminal 6 via the collector 9, the tab portion 9a of the collector 9, the inversion plate 15, and the conductive member 14.

Here, the inversion plate 15, the tab portion 9a of the collector 9, and the collector tab holder 16 constitute the current cutoff mechanism. That is, the inversion plate 15 is made to swell toward the through-hole 6b of the positive electrode external terminal 6 when the pressure in the outer can 1 increases. Because the thin-walled portion 9b of the tab portion 9a of the collector 9 is welded to the central part of the inversion plate 15, the thin-walled portion 9b of the tab portion 9a of the collector 9 breaks at the annular groove 9c when the pressure in the outer can 1 exceeds a predetermined value, and as a result, the electrical connection between the inversion plate 15 and the collector 9 is cut off. Note that the current cutoff mechanism can employ not only the above-described structure but also a structure in which metal foil is welded to the inversion plate 15, and then the periphery of the welded portion is welded to the collector, thus allowing the metal foil to break when the pressure in the outer can 1 has increased to deform the inversion plate 15.

The through-hole 6b formed in the positive electrode external terminal 6 is sealed by a terminal plug 17 made of rubber.

In addition, above the terminal plug 17, a metal plate 18 made of, for example, aluminum is laser-welded to be fixed to the positive electrode external terminal 6.

Note that, although the structure of the conductive path on the positive electrode side has been described here, such a structure can be employed as a structure of a conductive path on the negative electrode side. However, no current cutoff mechanism needs to be employed in the conductive path on the negative electrode side if the structure having the above-described current cutoff mechanism is employed for the conductive path on the positive electrode side. Therefore, a simpler structure can be employed for the conductive path on the negative electrode side.

To complete the prismatic lithium-ion secondary battery 10, the following steps have only to be taken: Electrically connect the electrode assembly 2 to the positive electrode external terminal 6 and the negative electrode external terminal 7 is inserted into the outer can 1. Fit the sealing plate 3 into the mouth of the outer can 1, and then, laser-weld the fitted portion to seal the mouth. Then, pour a predetermined amount of electrolyte through the electrolyte pour hole (not shown). Finally, seal the electrolyte pour hole with the sealing member 5

In the prismatic lithium-ion secondary battery 10, the space outside of the battery corresponding to the current cutoff mechanism is completely hermetically sealed. If the pressure in the outer can 1 increases after the current cutoff mechanism is operated, the gas exhaust valve 4 provided at the sealing plate 3 is opened so as to exhaust the gas out of the battery.

Next, a method for manufacturing the prismatic lithium-ion secondary battery 10 according to the embodiment will be described in more detail.

Manufacturing of Positive Electrode Plate $Li_2CO_3$ and $(Ni_{0.35}CO_{0.35}Mn_{0.3})_3O_4$ were mixed together so as to give a molar ratio of 1:1 between Li and $(Ni_{0.35}CO_{0.35}Mn_{0.3})$. Then, this mixture was baked for 20 hours in an air atmosphere at 900° C. to obtain a lithium-transition metal composite oxide expressed as $LiNi_{0.35}CO_{0.35}Mn_{0.3}O_2$ that serves as a positive electrode active material. The positive electrode active material thus obtained, flake graphite and carbon black that serve as a conductive agent, and N-methylpyrrolidone (NMP) solution of polyvinylidene fluoride (PVDF) serving as a binding agent were stirred so that the mass ratio of the lithium-transition metal composite oxide, the flake graphite, the carbon black, and the PVDF was 88:7:2:3 to prepare a positive electrode active material slurry.

Next, the positive electrode active material slurry was applied onto both surfaces of aluminum-alloy foil of 15 µm thickness so as to provide a positive electrode substrate exposed portion where a strip-shaped portion of the aluminum-alloy foil was exposed along one end side in the width direction thereof. Then, the slurry was dried to remove the NMP used as solvent at the preparation of the positive electrode active material slurry, and thus, a positive electrode active material mixture layer was formed. After that, the foil with the positive electrode active material mixture layer was rolled using rolling mill rolls until a predetermined packing density (2.61 g/cc) was obtained, and then, was cut to a predetermined dimension to obtain a positive electrode plate.

Manufacturing of Negative Electrode Plate

Artificial graphite serving as a negative electrode active material, carboxymethyl cellulose (CMC) serving as a thickening agent, and styrene-butadiene rubber (SBR) serving as a binding agent were stirred together with water to prepare a negative electrode active material slurry. Here, the negative electrode active material, the CMC, and the SBR were mixed together so as to have a mass ratio of 98:1:1. Next, the negative electrode active material slurry was applied onto both surfaces of copper foil of 10 µm thickness so as to provide a negative electrode substrate exposed portion where a strip-shaped portion of the copper foil was exposed along one end side in the width direction thereof. Then, the slurry was dried to remove the water used as solvent at the preparation of the slurry, and thus, a negative electrode active material mixture layer was formed. After that, the foil with the negative electrode active material mixture layer was rolled using rolling mill rolls until a predetermined packing density (1.11 g/cc) was obtained.

Next, alumina powder, binding agent composed of acrylate copolymer, and NMP serving as solvent were mixed together so as to have a mass ratio of 30:0.9:69.1, and were subjected to a mixing and dispersion treatment in a bead mill to prepare a protective layer slurry. The protective layer slurry thus prepared was applied onto the negative electrode active material mixture layer, and then, the NMP used as solvent was dried to be removed. Thus, a protective layer composed of the alumina and the binding agent was formed on the surface of the negative electrode active material mixture layer. After that, the foil with the layers thus formed was cut to a predetermined dimension to manufacture a negative electrode plate. Note that the thickness of the protective layer composed of the alumina and the binding agent was set to 3 µm.

Manufacturing of Flat-Shaped Electrode Assembly

The positive electrode plate and the negative electrode plate produced as described above were used for manufacturing the flat-shaped electrode assembly 2 as follows: The positive electrode plate and the negative electrode plate were wound into a flat shape with a porous separator of polyethylene (not shown) interposed therebetween so that the positive electrode substrate exposed portion was positioned at one end in the winding axis direction of the electrode plates while the negative electrode substrate exposed portion was positioned at the other end in the winding axis direction of the electrode plates.

Preparation of Electrolyte

A mixed solvent composed of 40 percent by volume of ethylene carbonate and 60 percent by volume of diethyl carbonate was prepared as a nonaqueous solvent of a nonaqueous electrolyte. Then, $LiPF_6$ serving as an electrolyte salt was added to and mixed with the mixed solvent so as to have a concentration of 1 mole/L. In addition, cyclohexylbenzene was added to and mixed with the solution thus prepared so as to have a concentration of 3 percent by mass relative to the electrolyte after the addition of the cyclohexylbenzene. Thus, an electrolyte was prepared.

Manufacturing of Conductive Path

Now, description will be made of a procedure for manufacturing the conductive path on the positive electrode side equipped with the current cutoff mechanism. First of all, the gasket 12 was disposed on an upper surface of the sealing plate 3, and the insulating member 13 and the conductive member 14 were disposed on a lower surface of the sealing plate 3. Then, the tubular portion 6a of the positive electrode external terminal 6 was inserted into the through-holes provided in the respective members thus disposed. After that, by crimping the leading end portion 6c of the positive electrode external terminal 6, the positive electrode external terminal 6, the gasket 12, the sealing plate 3, the insulating member 13, and the conductive member 14 were fixed integrally with each other.

Next, the inversion plate 15 was welded, along the circumference thereof, to the peripheral edge portion of the cup-shaped conductive member 14 in a completely hermetically sealed manner. Note that, here, a thin plate of aluminum was formed so as to have a lower projecting portion and used as the inversion plate 15. A laser welding technique was used as a method for welding between the conductive member 14 and the inversion plate 15.

The collector tab holder 16 made of resin was brought into contact with the inversion plate 15, and fixed by latching to the insulating member 13. Next, a projecting portion (not shown) provided on a lower surface of the collector tab holder 16 was inserted into a through-hole 9*d* provided in the tab portion 9*a* of the collector 9. Then, the projecting portion was crimped while being heated to fix the collector tab holder 16 to the collector 9. Then, an area enclosed by the groove 9*c* of the collector 9 was welded to the inversion plate 15 by using the laser welding technique. After that, $N_2$ gas of a predetermined pressure was introduced into the through-hole 6*b* from a top of the positive electrode external terminal 6, and the sealing condition of the welded portion between the conductive member 14 and the inversion plate 15 was inspected.

Then, the terminal plug 17 was inserted into the through-hole 6*b* of the positive electrode external terminal 6, and the metal plate 18 was welded and fixed to the positive electrode external terminal 6 by using the laser welding.

For the conductive path on the negative electrode side, a gasket was disposed on the upper surface of the sealing plate 3 while an insulating member and a negative electrode collector were disposed on the lower surface of the sealing plate 3, and a tubular portion of the negative electrode external terminal 7 was inserted into through-holes formed in the respective members thus disposed. After that, by crimping a leading end portion of the negative electrode external terminal 7, the negative electrode external terminal 7, the gasket, the sealing plate 3, the insulating member, and the negative electrode collector were fixed integrally with each other.

Manufacturing of Prismatic Lithium-Ion Secondary Battery

The positive electrode collector 9 and the positive electrode collector receiving part 11 fixed to the sealing plate 3 by using the above-described method were brought into contact with both external surfaces of the positive electrode substrate exposed portion 8 of the electrode assembly 2, and fixed thereto by resistance welding. The negative electrode collector and a negative electrode collector receiving part fixed to the sealing plate 3 by using the above-described method were also brought into contact with both external surfaces of the negative electrode substrate exposed portion of the electrode assembly 2, and fixed thereto by resistance welding.

After that, an outer circumference of the electrode assembly 2 was covered with an insulating sheet (not shown), and then, the electrode assembly 2 was inserted together with the insulating sheet into the outer can 1 having a prismatic shape. Then, the sealing plate 3 was fitted into the mouth portion of the outer can 1. Subsequently, the fitted portion between the sealing plate 3 and the outer can 1 was laser-welded.

After a predetermined amount of the nonaqueous electrolyte prepared by the above-described method was poured through the electrolyte pour hole provided in the sealing plate 3, an impregnation process (kept for 10 seconds under a pressure reduction of −0.05 MPa) and a preliminary charging process (charging for 10 seconds at a current of 1 A [0.2 C], and then 10 seconds at a current of 20 A [4 C]) were performed. Then, the electrolyte pour hole was hermetically sealed with the sealing member 5 to manufacture the prismatic lithium-ion secondary battery 10.

The prismatic lithium-ion secondary battery 10 thus manufactured was subjected to each of processes a to g, and v to x described below to produce each of batteries A to G, and V to X, respectively, and in addition, batteries Y and Z were produced. In each of the processes a to g, and v to x, a constant voltage charge was performed, and then, a constant current discharge of 1 C (5 A) was performed while applying natural cooling.

Battery A

The prismatic lithium-ion secondary battery 10 manufactured by the above-described procedure was subjected to a constant current charge at 40° C. and at 1 C (5 A) up to 4.3 V, and then, subjected to the process a in which a constant voltage charge of 4.3 V was performed for 3 hours under the constant temperature of 40° C. After that, the battery was subjected to the constant current discharge to be produced as the battery A.

Battery B

The prismatic lithium-ion secondary battery 10 manufactured by the above-described procedure was subjected to the constant current charge at 50° C. and at 1 C (5 A) up to 4.3 V, and then, subjected to the process b in which the constant voltage charge of 4.3 V was performed for 3 hours under the constant temperature of 50° C. After that, the battery was subjected to the constant current discharge to be produced as the battery B.

Battery C

The prismatic lithium-ion secondary battery 10 manufactured by the above-described procedure was subjected to the constant current charge at 60° C. and at 1 C (5 A) up to 4.3 V, and then, subjected to the process c in which the constant voltage charge of 4.3 V was performed for 3 hours under the constant temperature of 60° C. After that, the battery was subjected to the constant current discharge to be produced as the battery C.

Battery D

The prismatic lithium-ion secondary battery 10 manufactured by the above-described procedure was subjected to the constant current charge at 60° C. and at 1 C (5 A) up to 4.25 V, and then, subjected to the process d in which the constant voltage charge of 4.25 V was performed for 3 hours under the constant temperature of 60° C. After that, the battery was subjected to the constant current discharge to be produced as the battery D.

Battery E

The prismatic lithium-ion secondary battery 10 manufactured by the above-described procedure was subjected to the constant current charge at 60° C. and at 1 C (5 A) up to 4.2 V, and then, subjected to the process e in which the constant voltage charge of 4.2 V was performed for 3 hours under the constant temperature of 60° C. After that, the battery was subjected to the constant current discharge to be produced as the battery E.

Battery F

The prismatic lithium-ion secondary battery 10 manufactured by the above-described procedure was subjected to the constant current charge at 40° C. and at 1 C (5 A) up to 4.3 V, and then, subjected to the process f in which the constant voltage charge of 4.3 V was performed for 30 minutes under the constant temperature of 40° C. After that, the battery was subjected to the constant current discharge to be produced as the battery F.

Battery G

The prismatic lithium-ion secondary battery 10 manufactured by the above-described procedure was subjected to the constant current charge at 40° C. and at 1 C (5 A) up to 4.2 V, and then, subjected to the process g in which the constant voltage charge of 4.2 V was performed for 30 minutes under the constant temperature of 40° C. After that, the battery was subjected to the constant current discharge to be produced as the battery G.

Battery V

The prismatic lithium-ion secondary battery 10 manufactured by the above-described procedure was subjected to the constant current charge at 25° C. and at 1 C (5 A) up to 4.3 V, and then, subjected to the process v in which the constant voltage charge of 4.3 V was performed for 3 hours under the constant temperature of 25° C. After that, the battery was subjected to the constant current discharge to be produced as the battery V.

Battery W

The prismatic lithium-ion secondary battery 10 manufactured by the above-described procedure was subjected to the constant current charge at 40° C. and at 1 C (5 A) up to 4.1 V, and then, subjected to the process w in which the constant voltage charge of 4.1 V was performed for 3 hours under the constant temperature of 40° C. After that, the battery was subjected to the constant current discharge to be produced as the battery W.

Battery X

The prismatic lithium-ion secondary battery 10 manufactured by the above-described procedure was subjected to the constant current charge at 40° C. and at 1 C (5 A) up to 4.3 V, and then, subjected to the process x in which the constant voltage charge of 4.3 V was performed for 10 minutes under the constant temperature of 40° C. After that, the battery was subjected to the constant current discharge to be produced as the battery X.

Battery Y

The prismatic lithium-ion secondary battery 10 manufactured by the above-described procedure was used as the battery Y without being subjected to any particular process.

Battery Z

A battery that has the same structure as that of the prismatic lithium-ion secondary battery 10 except for having no cyclohexylbenzene added to the nonaqueous electrolyte was manufactured as the battery Z without being subjected to any particular process.

Overcharging Test

The 12 types of batteries A to G, and V to Z manufactured as described above were charged at a charging current of 1 C (5 A) until a battery voltage of 4.1 V was achieved. After that, each of the batteries was kept for 2 hours under an environment of −10° C. so as to adjust the temperature of the entire batteries to −10° C. Then, under the environment of −10° C., each overcharging test was conducted by performing a constant current charge of 4 C (20 A). Note that the operating pressure of all of the current cutoff mechanisms in the batteries A to G, and V to Z was set to 0.8 MPa. Measurements were made of the time from when the constant current charge of 4 C (20 A) was started until the current cutoff mechanism operated, and of the battery temperature during the period until the current cutoff mechanism operated. The battery temperature was measured at a central part of a larger area side surface of the outer can. Table 1 shows the time from when the constant current charge of 4 C (20 A) was started until the current cutoff mechanism operated in each battery, and the maximum temperature of each battery during the period until the current cutoff mechanism operated, as well as the charging process conditions of each battery.

TABLE 1

| | Charging Process Voltage (V) | Charging Process Temp. (° C.) | Charging Process Time (h) | Time from Overcharging Test Start to Current Cutoff Mechanism Operation (s) | Battery Max. Temp. Before Current Cutoff Mechanism Operation (° C.) |
|---|---|---|---|---|---|
| Battery A | 4.3 | 40 | 3 | 740 | 38 |
| Battery B | 4.3 | 50 | 3 | 520 | 32 |
| Battery C | 4.3 | 60 | 3 | 330 | 28 |
| Battery D | 4.25 | 60 | 3 | 750 | 40 |
| Battery E | 4.2 | 60 | 3 | 820 | 43 |
| Battery F | 4.3 | 40 | 0.5 | 830 | 45 |
| Battery G | 4.2 | 40 | 0.5 | 900 | 49 |
| Battery V | 4.3 | 25 | 3 | 1310 | 75 |
| Battery W | 4.1 | 40 | 3 | 1290 | 75 |
| Battery X | 4.3 | 40 | 0.17 | 1300 | 74 |
| Battery Y | — | — | — | 1340 | 78 |
| Battery Z | — | — | — | 1450 | 87 |

In the battery Z, which did not contain cyclohexylbenzene in the electrolyte thereof, the current cutoff mechanism required 1450 seconds to operate, and the battery temperature rose to 87° C. In the battery Y, which was not subjected to any process, the current cutoff mechanism required 1340 seconds to operate, and the battery temperature rose to 78° C. On the other hand, in each of the batteries A to G subjected to the processes a to g, respectively, the current cutoff mechanism required a period of time of 330 to 900 seconds to operate, and the maximum battery temperature before the operation of the current cutoff mechanism was 28° C. to 49° C. From these results, it is found that, in the batteries A to G subjected to the processes a to g, the current cutoff mechanisms require shorter periods of time to operate, and the temperature rise of the batteries can be suppressed. In the batteries V to X subjected to the processes v to x, only slight improvements were achieved over the battery Y, which was not subjected to any process.

Analysis of Electrolyte

For the battery C, the amounts of cyclohexylbenzene contained in the electrolyte before and after the process c were measured by using a gas chromatograph (GC-2014 made by Shimadzu Corporation). As a result of the measurement, in the battery C before being subjected to the process c, the amount of cyclohexylbenzene contained in the electrolyte was 3.00 percent by mass, thus showing no change from the added amount of the cyclohexylbenzene to the electrolyte. In contrast, in the battery C after the process c, the amount of cyclohexylbenzene contained in the electrolyte was 0.98 percent by mass, thus decreasing to approximately a third of the added amount. This is considered to be because a part of the cyclohexylbenzene contained in the electrolyte was oxidized on the surface of the positive electrode plate to be converted into biphenyl, an oligomer of cyclohexylbenzene, a polymer of cyclohexylbenzene, a modified product of the oligomer of cyclohexylbenzene, and a modified product of the polymer of cyclohexylbenzene.

Analysis of Surface of Positive Electrode Plate

The batteries C and Y were disassembled, and the surfaces of positive electrode plates of the respective batteries C and Y were analyzed by infrared spectroscopy using a Spectrum One FT-IR Spectrometer made by PerkinElmer, Inc. As a result of the analysis, a peak derived from a C—H bond in a benzene ring was detected at 3050 cm$^{-1}$ from the surface of the positive electrode plate of the battery C. In the battery C, because the cyclohexylbenzene added to the electrolyte was the only compound containing a benzene ring, it was confirmed that the above-described peak was a peak derived from the cyclohexylbenzene, and therefore, that compounds derived from the cyclohexylbenzene were present on the surface of the positive electrode plate of the battery C. These compounds are considered to be an oligomer of cyclohexylbenzene, a polymer of cyclohexylbenzene, a modified product of the oligomer of cyclohexylbenzene, and a modified product of the polymer of cyclohexylbenzene. The peak appearing at 3050 cm$^{-1}$ was not detected from the surface of the positive electrode plate of the battery Y. From this result, it was confirmed that any compound derived from cyclohexylbenzene was not present on the surface of the positive electrode plate of the battery Y.

From the above-described analyses of the electrolyte and of the surfaces of the positive electrode plates, the results shown in Table 1 will be discussed as follows. In the battery Y, which was not subjected to any process, when the battery has been overcharged, the cyclohexylbenzene uniformly distributed in the electrolyte is gradually oxidized on the surface of the positive electrode plate. Therefore, gas is produced at a small rate, and thus, it takes time until an enough amount of gas is produced to attain the operating pressure of the current cutoff mechanism.

On the other hand, in the batteries A to G, it is considered that the processes a to g allow the cyclohexylbenzene contained in the electrolyte to change, on the surface of the positive electrode plate, to compounds such as the oligomer of cyclohexylbenzene, the polymer of cyclohexylbenzene, the modified product of the oligomer of cyclohexylbenzene, and the modified product of the polymer of cyclohexylbenzene without losing the gas producing function in the overcharged state, and to remain on the surface of the positive electrode plate. Therefore, it is considered to be possible to produce the required amount of gas for operating the current cutoff mechanism in a short period of time when the battery has been overcharged.

In the batteries V to X subjected to the processes v to x, the current cutoff mechanism required 1290 to 1310 seconds to operate, and the battery temperature rose to 74° C. to 75° C. This is considered to be because, in the processes v to x, an insufficient amount of the oligomer of cyclohexylbenzene, the polymer of cyclohexylbenzene, the modified product of the oligomer of cyclohexylbenzene, and the modified product of the polymer of cyclohexylbenzene was produced on the surface of the positive electrode plate. Therefore, it is found to be preferable to perform the charging process for 30 minutes or more under charging conditions of 40° C. or more and 4.2 V or more in order to produce a sufficient amount of the oligomer of cyclohexylbenzene, the polymer of cyclohexylbenzene, the modified product of the oligomer of cyclohexylbenzene, and the modified product of the polymer of cyclohexylbenzene. In addition, it is found to be more preferable to perform the charging process for 3 hours or more under charging conditions of 60° C. or more and 4.2 V or more, or for 30 minutes or more under charging conditions of 40° C. or more and 4.3 V or more. Moreover, it is found to be still more preferable to perform the charging process for 3 hours or more under charging conditions of 40° C. or more and 4.3 V or more.

The discharge process after each of the processes is not necessarily a required process. However, it is preferable to perform the discharge process because storing the battery in a charged state of 4.2 V or more leads to degradation of the electrolyte and various members in the battery.

In order to confirm the state of the cyclohexylbenzene in the batteries A to G, and V to Y, the concentrations of the cyclohexylbenzene and biphenyl that is a modified product thereof contained in the electrolytes of the batteries A to G, and V to Y were measured by using the gas chromatograph (GC-2014 made by Shimadzu Corporation). Table 2 shows values obtained by subtracting the amounts of cyclohexylbenzene and biphenyl from corresponding added amounts of the cyclohexylbenzene, where the amounts of cyclohexylbenzene and biphenyl were determined by analyzing by gas chromatography the electrolytes collected from the batteries A to G, and V to Y. To collect each electrolyte, the electrolyte present between the electrode assembly and the outer can was taken out, and in addition, the electrolyte present in the electrode assembly was extracted by centrifugal separation. Then, these electrolytes were uniformly mixed together, and subjected to the measurement described above.

TABLE 2

|  | Amount of Cyclohexylbenzene (% by mass) | Amount of Biphenyl (% by mass) | Added Amount of Cyclohexylbenzene − (Measured Amount of Cyclohexylbenzene + Measured Amount of Biphenyl) (% by mass) |
|---|---|---|---|
| Battery A | 2.85 | 0.03 | 0.12 |
| Battery B | 2.43 | 0.31 | 0.26 |
| Battery C | 0.98 | 0.33 | 1.69 |
| Battery D | 2.70 | 0.21 | 0.09 |
| Battery E | 2.90 | 0.04 | 0.06 |
| Battery F | 2.92 | 0.02 | 0.06 |
| Battery G | 2.95 | 0.00 | 0.05 |
| Battery V | 2.99 | 0.00 | 0.01 |
| Battery W | 3.00 | 0.00 | 0.00 |
| Battery X | 2.99 | 0.00 | 0.01 |
| Battery Y | 3.00 | 0.00 | 0.00 |

It is found that, in each of the batteries V to Y, the amount of the cyclohexylbenzene contained in the electrolyte is substantially the same as the added amount thereof, and thus, the cyclohexylbenzene in the electrolyte is hardly changed without any process or by each of the processes v to x. In contrast, in each of the batteries A to G subjected to the processes a to g, the amount of the cyclohexylbenzene contained in the electrolyte is reduced from the added amount. In addition, the batteries A to G have biphenyl derived from cyclohexylbenzene detected by the analysis by gas chromatography. The amount obtained by subtracting the amount of this biphenyl from the reduced amount of the cyclohexylbenzene is considered to be the amount of the oligomer of cyclohexylbenzene, the polymer of cyclohexylbenzene, the modified product of the oligomer of cyclohexylbenzene, and the modified product of the polymer of cyclohexylbenzene that were produced by each of the processes a to g.

Here, the oligomer of cyclohexylbenzene, the polymer of cyclohexylbenzene, the modified product of the oligomer of cyclohexylbenzene, and the modified product of the polymer of cyclohexylbenzene are considered to be produced on the surface of the positive electrode plate and to remain still on the surface of the positive electrode plate.

From the measurement result of the battery G, it is found that, when the battery has been overcharged, the current cutoff mechanism can be operated more reliably in a short period of time if the total amount of the oligomer of cyclohexylbenzene, the polymer of cyclohexylbenzene, the modified product of the oligomer of cyclohexylbenzene, and the modified product of the polymer of cyclohexylbenzene is 0.05 percent or more by mass relative to the total mass of the nonaqueous electrolyte based on the monomer of cyclohexylbenzene.

From the results described above, it was confirmed that the oligomer of cyclohexylbenzene, the polymer of cyclohexylbenzene, the modified product of the oligomer of cyclohexylbenzene, and the modified product of the polymer of cyclohexylbenzene can be made present on the surface of the positive electrode plate by applying a predetermined process in the manufacturing stage of the battery, and therefore, that it is possible to obtain a nonaqueous electrolyte secondary battery with high safety that is capable of operating the current cutoff mechanism in a short period of time when the battery has been overcharged.

Next, a study was conducted under modified charging process conditions.

The prismatic lithium-ion secondary battery 10 manufactured by the above-described procedure was subjected to each of processes h to s, and u to w' described below to produce each of c, respectively. In each of the processes h to s, and u to w', the constant voltage charge was performed, and then, the constant current discharge of 1 C (5 A) was performed while applying natural cooling.

Battery H

The prismatic lithium-ion secondary battery 10 manufactured by the above-described procedure was subjected to the constant current charge at 70° C. and at 1 C (5 A) up to 3.75 V, and then, subjected to the process h in which the constant voltage charge of 3.75 V was performed for 22 hours under the constant temperature of 70° C. After that, the battery was subjected to the constant current discharge to be produced as the battery H.

Battery I

The prismatic lithium-ion secondary battery 10 manufactured by the above-described procedure was subjected to the constant current charge at 75° C. and at 1 C (5 A) up to 3.75 V, and then, subjected to the process in which the constant voltage charge of 3.75 V was performed for 22 hours under the constant temperature of 75° C. After that, the battery was subjected to the constant current discharge to be produced as the battery I.

Battery J

The prismatic lithium-ion secondary battery 10 manufactured by the above-described procedure was subjected to the constant current charge at 80° C. and at 1 C (5 A) up to 3.75 V, and then, subjected to the process j in which the constant voltage charge of 3.75 V was performed for 22 hours under the constant temperature of 80° C. After that, the battery was subjected to the constant current discharge to be produced as the battery J.

Battery K

The prismatic lithium-ion secondary battery 10 manufactured by the above-described procedure was subjected to the constant current charge at 70° C. and at 1 C (5 A) up to 3.80 V, and then, subjected to the process k in which the constant voltage charge of 3.80 V was performed for 22 hours under the constant temperature of 70° C. After that, the battery was subjected to the constant current discharge to be produced as the battery K.

Battery L

The prismatic lithium-ion secondary battery 10 manufactured by the above-described procedure was subjected to the constant current charge at 75° C. and at 1 C (5 A) up to 3.80 V, and then, subjected to the process 1 in which the constant voltage charge of 3.80 V was performed for 22 hours under the constant temperature of 75° C. After that, the battery was subjected to the constant current discharge to be produced as the battery L.

Battery M

The prismatic lithium-ion secondary battery 10 manufactured by the above-described procedure was subjected to the constant current charge at 80° C. and at 1 C (5 A) up to 3.80 V, and then, subjected to the process m in which the constant voltage charge of 3.80 V was performed for 22 hours under the constant temperature of 80° C. After that, the battery was subjected to the constant current discharge to be produced as the battery M.

Battery N

The prismatic lithium-ion secondary battery 10 manufactured by the above-described procedure was subjected to the constant current charge at 70° C. and at 1 C (5 A) up to 3.90 V, and then, subjected to the process n in which the constant voltage charge of 3.90 V was performed for 22 hours under the constant temperature of 70° C. After that, the battery was subjected to the constant current discharge to be produced as the battery N.

Battery O

The prismatic lithium-ion secondary battery 10 manufactured by the above-described procedure was subjected to the constant current charge at 75° C. and at 1 C (5 A) up to 3.90 V, and then, subjected to the process o in which the constant voltage charge of 3.90 V was performed for 22 hours under the constant temperature of 75° C. After that, the battery was subjected to the constant current discharge to be produced as the battery O.

Battery P

The prismatic lithium-ion secondary battery 10 manufactured by the above-described procedure was subjected to the constant current charge at 80° C. and at 1 C (5 A) up to 3.90 V, and then, subjected to the process p in which the constant voltage charge of 3.90 V was performed for 20 hours under the constant temperature of 80° C. After that, the battery was subjected to the constant current discharge to be produced as the battery P.

Battery Q

The prismatic lithium-ion secondary battery 10 manufactured by the above-described procedure was subjected to the constant current charge at 70° C. and at 1 C (5 A) up to 4.00 V, and then, subjected to the process q in which the constant voltage charge of 4.00 V was performed for 22 hours under the constant temperature of 70° C. After that, the battery was subjected to the constant current discharge to be produced as the battery Q.

Battery R

The prismatic lithium-ion secondary battery 10 manufactured by the above-described procedure was subjected to the constant current charge at 75° C. and at 1 C (5 A) up to 4.00 V, and then, subjected to the process r in which the constant voltage charge of 4.00 V was performed for 18 hours under the constant temperature of 75° C. After that, the battery was subjected to the constant current discharge to be produced as the battery R.

Battery S

The prismatic lithium-ion secondary battery 10 manufactured by the above-described procedure was subjected to the constant current charge at 80° C. and at 1 C (5 A) up to 4.00 V, and then, subjected to the process in which the constant voltage charge of 4.00 V was performed for 15 hours under the constant temperature of 80° C. After that, the battery was subjected to the constant current discharge to be produced as the battery S.

Battery U

The prismatic lithium-ion secondary battery 10 manufactured by the above-described procedure was subjected to the constant current charge at 70° C. and at 1 C (5 A) up to 3.70

V, and then, subjected to the process u in which the constant voltage charge of 3.70 V was performed for 34 hours under the constant temperature of 70° C. After that, the battery was subjected to the constant current discharge to be produced as the battery U.

Battery V'

The prismatic lithium-ion secondary battery 10 manufactured by the above-described procedure was subjected to the constant current charge at 60° C. and at 1 C (5 A) up to 3.75 V, and then, subjected to the process v' in which the constant voltage charge of 3.75 V was performed for 34 hours under the constant temperature of 60° C. After that, the battery was subjected to the constant current discharge to be produced as the battery V'.

Battery W'

The prismatic lithium-ion secondary battery 10 manufactured by the above-described procedure was subjected to the constant current charge at 70° C. and at 1 C (5 A) up to 4.00 V, and then, subjected to the process h in which the constant voltage charge of 4.00 V was performed for 15 hours under the constant temperature of 70° C. After that, the battery was subjected to the constant current discharge to be produced as the battery W'.

Overcharging Test

The 15 types of batteries H to S, and U to W' manufactured as described above were charged at a charging current of 1 C (5 A) until a battery voltage of 4.1 V was achieved. After that, each of the batteries was kept for 2 hours under an environment of −10° C. so as to adjust the temperature of the entire batteries to −10° C. Then, under the environment of −10° C., each overcharging test was conducted by performing a constant current charge of 4 C (20 A). Note that the operating pressure of all of the current cutoff mechanisms in the batteries H to S, and U to W' was set to 0.8 MPa. Measurements were made of the time from when the constant current charge of 4 C (20 A) was started until the current cutoff mechanism operated, and of the battery temperature during the period until the current cutoff mechanism operated. The battery temperature was measured at a central part of a larger area side surface of the outer can. Table 3 shows the time from when the constant current charge of 4 C (20 A) was started until the current cutoff mechanism operated in each battery, and the maximum temperature of each battery during the period until the current cutoff mechanism operated, as well as the charging process conditions of each battery.

TABLE 3

| | Charging Process Voltage (V) | Charging Process Temp. (° C.) | Charging Process Time (h) | Time from Overcharging Test Start to Current Cutoff Mechanism Operation (s) | Battery Max. Temp. Before Current Cutoff Mechanism Operation (° C.) |
|---|---|---|---|---|---|
| Battery H | 3.75 | 70 | 22 | 960 | 55 |
| Battery I | 3.75 | 75 | 22 | 957 | 54 |
| Battery J | 3.75 | 80 | 22 | 953 | 54 |
| Battery K | 3.80 | 70 | 22 | 955 | 55 |
| Battery L | 3.80 | 75 | 22 | 959 | 56 |
| Battery M | 3.80 | 80 | 22 | 956 | 55 |
| Battery N | 3.90 | 70 | 22 | 951 | 53 |
| Battery O | 3.90 | 75 | 22 | 946 | 53 |
| Battery P | 3.90 | 80 | 20 | 947 | 54 |
| Battery Q | 4.00 | 70 | 22 | 945 | 53 |
| Battery R | 4.00 | 75 | 18 | 943 | 53 |
| Battery S | 4.00 | 80 | 15 | 940 | 52 |
| Battery U | 3.70 | 70 | 34 | 1010 | 58 |

TABLE 3-continued

| | Charging Process Voltage (V) | Charging Process Temp. (° C.) | Charging Process Time (h) | Time from Overcharging Test Start to Current Cutoff Mechanism Operation (s) | Battery Max. Temp. Before Current Cutoff Mechanism Operation (° C.) |
|---|---|---|---|---|---|
| Battery V' | 3.75 | 60 | 34 | 1050 | 60 |
| Battery W' | 4.00 | 70 | 15 | 1080 | 62 |
| Battery Y | — | — | — | 1340 | 78 |
| Battery Z | — | — | — | 1450 | 87 |

In each of the batteries H to S subjected to the processes h to s, respectively, the current cutoff mechanism required a period of time of 940 to 960 seconds to operate, and the maximum battery temperature before the operation of the current cutoff mechanism was 52° C. to 56° C. From these results, it is found that, in the batteries H to S subjected to the processes h to s, the current cutoff mechanisms require shorter periods of time to operate, and the temperature rise of the batteries can be suppressed. The batteries U to W' subjected to the processes u to w', respectively, were also improved over the batteries Y and Z, which were not subjected to any process, but resulted in requiring periods of time exceeding 1000 seconds until the current cutoff mechanisms thereof operate.

Analysis of Electrolyte

For the battery S, the amounts of cyclohexylbenzene contained in the electrolyte before and after the process s were measured by using the gas chromatograph (GC-2014 made by Shimadzu Corporation). As a result of the measurement, in the battery S before being subjected to the process s, the amount of cyclohexylbenzene contained in the electrolyte was 3.00 percent by mass, thus showing no change from the added amount of the cyclohexylbenzene to the electrolyte. On the other hand, in the battery S after the process s, the amount of cyclohexylbenzene contained in the electrolyte was 2.97 percent by mass, thus showing that the cyclohexylbenzene had hardly been reduced. This result shows that the cyclohexylbenzene contained in the electrolyte was hardly converted into biphenyl, the oligomer of cyclohexylbenzene, the polymer of cyclohexylbenzene, the modified product of the oligomer of cyclohexylbenzene, or the modified product of the polymer of cyclohexylbenzene, although the process s was applied.

Analysis of Electrolyte Near Surface of Positive Electrode Plate

The battery S after the process s was disassembled, and gas chromatography measurement was conducted at 10 points to obtain the amounts of the cyclohexylbenzene contained in the electrolyte in the vicinity of the surface of the positive electrode plate and the cyclohexylbenzene contained in the electrolyte in the vicinity of the surface of the negative electrode plate opposed to the positive electrode plate with the separator interposed therebetween. As a result, it was found that the amount of the cyclohexylbenzene contained in the electrolyte in the vicinity of the surface of the positive electrode plate was 3.10 percent by mass on average, and the amount of the cyclohexylbenzene contained in the electrolyte in the vicinity of the surface of the negative electrode plate was 2.91 percent by mass on average, thus, the concentration of cyclohexylbenzene being higher in the vicinity of the surface of the positive electrode plate than in the vicinity of the surface of the negative electrode plate.

From the above-described analysis of the electrolyte, the results shown in Table 3 will be discussed as follows. In each of the batteries Y and Z, which were not subjected to any process, when the battery has been overcharged, the cyclohexylbenzene uniformly distributed in the electrolyte is gradually oxidized on the surface of the positive electrode plate. Therefore, gas is produced at a small rate, and thus, it takes time until an enough amount of gas is produced to attain the operating pressure of the current cutoff mechanism. On the other hand, in the batteries H to S, it is considered that the processes h to s allow the cyclohexylbenzene contained in the electrolyte to move to the vicinity of the surface of the positive electrode plate, and to remain on the surface of the positive electrode plate. Therefore, it is considered to be possible to produce the required amount of gas for operating the current cutoff mechanism in a short period of time when the battery has been overcharged.

In the batteries U to W' subjected to the processes u to w', the current cutoff mechanism required 1010 to 1080 seconds to operate, and the battery temperature rose to 58° C. to 62° C. These results are considered to indicate the following: The batteries U to W' were placed in a state in which a greater amount of the cyclohexylbenzene is present in the vicinity of the surface of the positive electrode plate than in the batteries Y and Z, which were not subjected to any process. However, the effect of that state was smaller than that of the batteries H to S subjected to the processes h to s.

From these results, it is found to be preferable to perform the charging process for 22 hours or more under charging conditions of 70° C. or more and 3.75 V or more in order to obtain a concentration of the cyclohexylbenzene in the vicinity of the surface of the positive electrode plate so that the current cutoff mechanism operates within 1000 seconds.

The discharge process after each of the processes is not necessarily a required process.

In order to confirm the state of the cyclohexylbenzene in the batteries H to S, and U to W', the concentrations of the cyclohexylbenzene and biphenyl that is a modified product thereof contained in the electrolytes of the batteries H to S, and U to W' were measured by using the gas chromatograph (GC-2014 made by Shimadzu Corporation). Table 4 shows values obtained by subtracting the amounts of cyclohexylbenzene and biphenyl from corresponding added amounts of the cyclohexylbenzene, where the amounts of cyclohexylbenzene and biphenyl were determined by analyzing by gas chromatography the electrolytes collected from the batteries H to S, and U to W'. To collect each electrolyte, the electrolyte present between the electrode assembly and the outer can was taken out, and in addition, the electrolyte present in the electrode assembly was extracted by centrifugal separation. Then, these electrolytes were uniformly mixed together, and subjected to the measurement described above.

TABLE 4

|  | Amount of Cyclohexylbenzene (% by mass) | Amount of Biphenyl (% by mass) | Added Amount of Cyclohexylbenzene − (Measured Amount of Cyclohexylbenzene + Measured Amount of Biphenyl) (% by mass) |
| --- | --- | --- | --- |
| Battery H | 2.99 | 0.00 | 0.01 |
| Battery I | 2.99 | 0.00 | 0.01 |
| Battery J | 2.99 | 0.00 | 0.01 |
| Battery K | 2.99 | 0.00 | 0.01 |
| Battery L | 2.99 | 0.00 | 0.01 |
| Battery M | 2.99 | 0.00 | 0.01 |

TABLE 4-continued

|  | Amount of Cyclohexylbenzene (% by mass) | Amount of Biphenyl (% by mass) | Added Amount of Cyclohexylbenzene − (Measured Amount of Cyclohexylbenzene + Measured Amount of Biphenyl) (% by mass) |
| --- | --- | --- | --- |
| Battery N | 2.98 | 0.01 | 0.01 |
| Battery O | 2.98 | 0.01 | 0.01 |
| Battery P | 2.98 | 0.01 | 0.01 |
| Battery Q | 2.97 | 0.02 | 0.01 |
| Battery R | 2.97 | 0.02 | 0.01 |
| Battery S | 2.97 | 0.02 | 0.01 |
| Battery U | 2.99 | 0.00 | 0.01 |
| Battery V' | 2.99 | 0.00 | 0.01 |
| Battery W' | 2.99 | 0.01 | 0.00 |

From these results, it is found that the amount of cyclohexylbenzene contained in the electrolyte of the batteries H to S, and U to W' is at the substantially same level as that of the added amount of the cyclohexylbenzene, or of the batteries Y and Z, which were not subjected to any process.

Therefore, it is found that the oligomer of cyclohexylbenzene, the polymer of cyclohexylbenzene, the modified product of the oligomer of cyclohexylbenzene, or the modified product of the polymer of cyclohexylbenzene is hardly produced on the surface of the positive electrode plate in the batteries H to S, and U to W' subjected to the processes h to s, and u to w', unlike in the batteries A to G subjected to the processes a to g.

It is considered that the batteries H to S, and U to W' are subjected to the processes h to s, and u to w', respectively, and thus, the concentration of the cyclohexylbenzene in the vicinity of the surface of the positive electrode plate is increased. This is considered to be the reason why it is possible to obtain a nonaqueous electrolyte secondary battery with high safety that is capable of operating the current cutoff mechanism in a short period of time when the battery has been overcharged. The mechanism of the increase in the concentration of the cyclohexylbenzene in the vicinity of the surface of the positive electrode plate is considered as the following: A modified product of cyclohexylbenzene is produced on the surface of the positive electrode plate at a very small concentration of 0.01 percent by weight, thus, causing first a reduction of the cyclohexylbenzene in the vicinity of the surface of the positive electrode plate. Then, the concentration gradient thus produced causes the cyclohexylbenzene to move to the vicinity of the surface of the positive electrode plate. However, the details are unknown.

According to the nonaqueous electrolyte secondary battery of the invention, it is possible to obtain a nonaqueous electrolyte secondary battery with excellent safety that is capable of operating a pressure-sensitive current cutoff mechanism in a short period of time when the battery has been overcharged. In addition, according to the method for manufacturing the nonaqueous electrolyte secondary battery of the invention, it is possible to easily manufacture the nonaqueous electrolyte secondary battery with excellent safety that is capable of operating the pressure-sensitive current cutoff mechanism in a short period of time when the battery has been overcharged.

Additional Matters

The structure of the current cutoff mechanism in the invention is not particularly limited, as long as the structure can cut off a current in response to a rise in pressure inside an outer body. For example, in the case of a battery in which the positive electrode external terminal and the negative electrode external terminal project from the outer body or from the sealing plate that seals the mouth portion of the outer body, it is sufficient to provide the current cutoff mechanism in the conductive path from the positive electrode plate to the positive electrode external terminal, or in the conductive path from the negative electrode plate to the negative electrode external terminal. Otherwise, in the case in which the outer body serves also as one electrode external terminal, and the sealing plate sealing the mouth portion of the outer body serves also as the other electrode external terminal, it is sufficient to provide the current cutoff mechanism either in a conductive path between an electrode plate and the sealing plate, or in a conductive path between another electrode plate and the outer body.

The nonaqueous electrolyte secondary battery according to the invention can use, for example, the following lithium-transition metal composite oxides as the positive electrode active material: a lithium cobalt oxide ($LiCoO_2$), a lithium manganese oxide ($LiMn_2O_4$), a lithium nickel oxide ($LiNiO_2$), a lithium-nickel-manganese composite oxide ($LiNi_{1-x}Mn_xO_2$, where $0<x<1$), a lithium-nickel-cobalt composite oxide ($LiNi_{1-x}Co_xO_2$, where $0<x<1$), and a lithium-nickel-cobalt-manganese composite oxide ($LiNi_xCo_yMn_zO_2$, where $0<x<1$, $0<y<1$, $0<z<1$, and $x+y+z=1$). In addition, compounds obtained by adding an element such as Al, Ti, Zr, Nb, B, Mg, or Mo to the above-mentioned lithium-transition metal composite oxides can also be used. An example is a lithium-transition metal composite oxide represented by $Li_{1+a}Ni_xCo_yMn_zM_bO_2$ (where M is at least one type of element selected from Al, Ti, Zr, Nb, B, Mg, and Mo; $0 \le a \le 0.2$, $0.2 \le x \le 0.5$, $0.2 \le y \le 0.5$, $0.2 \le z \le 0.4$, $0 \le b \le 0.02$, and $a+b+x+y+z=1$).

As the negative electrode active material, a carbon material capable of absorbing and desorbing lithium ions can be used. Examples of the carbon material capable of absorbing and desorbing lithium ions are graphite, non-graphitizable carbon, graphitizable carbon, filamentous carbon, coke, and carbon black, of which graphite is the most preferable. In addition, non-carbon-based materials such as silicon, tin, and alloys and oxides based thereon can be used.

The nonaqueous electrolyte secondary battery according to the invention can use, as the nonaqueous solvent (organic solvent), compounds, such as carbonates, lactones, ethers, ketones, and esters, that have conventionally been used in general in nonaqueous electrolyte secondary batteries. Mixtures of two or more of these solvents can be used. For example, cyclic carbonates such as ethylene carbonate, propylene carbonate, and butylene carbonate, and chain carbonates such as dimethyl carbonate, ethyl methyl carbonate, and diethyl carbonate can be used. Particularly, it is preferable to use a mixed solvent of cyclic carbonates and chain carbonates. Unsaturated cyclic carbonic acid esters such as vinylene carbonate (VC) can also be added to the nonaqueous electrolyte.

Any compound that have commonly been used as an electrolyte salt in conventional lithium-ion secondary batteries can be used as the electrolyte salt in the nonaqueous electrolyte of the nonaqueous electrolyte secondary battery according to the invention. For example, compounds such as $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, and $LiP(C_2O_4)F_4$, and mixtures thereof can be used. Among these compounds, $LiPF_6$ is the most preferable one. A preferable amount of the electrolyte salt in the nonaqueous solvent is 0.5 to 2.0 mol/L.

The pressure-sensitive current cutoff mechanism in the invention should only be capable of cutting off a current by a rise in internal pressure of a battery. The structure of the pressure-sensitive current cutoff mechanism is not limited to the embodiment, and may be either of a returnable type or a non-returnable type.

Although description has been made of an example of a prismatic battery in the embodiment, the nonaqueous electrolyte secondary battery of invention is not limited to the prismatic battery, but may be a cylindrical battery.

The invention is effective when applied to a high-capacity nonaqueous electrolyte secondary battery of 5 Ah or more, and particularly effective when applied to a high-capacity nonaqueous electrolyte secondary battery of 20 Ah or more.

What is claimed is:

1. A nonaqueous electrolyte secondary battery comprising:
    an electrode assembly including a positive electrode plate, a negative electrode plate, and a separator interposed between the positive electrode plate and the negative electrode plate;
    an outer body housing the electrode assembly and a nonaqueous electrolyte; and
    a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery,
    at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group being present on the surface of the positive electrode plate;
    wherein the battery is able to work as a secondary battery; and
    wherein the current cutoff mechanism operates at a pressure of 0.4 MPa to 1.5 MPa, and the time required for the operation of the current cutoff mechanism is within 1000 seconds from a start of a constant current charge of 4 C that is performed under an environment of $-10°$ C. after a battery voltage is set to 4.1 V and a battery temperature is set to $-10°$ C.

2. A method for manufacturing a nonaqueous electrolyte secondary battery including an electrode assembly including a positive electrode plate, a negative electrode plate, and a separator interposed between the positive electrode plate and the negative electrode plate, an outer body housing the electrode assembly and a nonaqueous electrolyte, and a current cutoff mechanism that cuts off a current in response to a rise in pressure inside the outer body in at least one of a conductive path through which a current is taken out from the positive electrode plate to outside of the battery and a conductive path through which a current is taken out from the negative electrode plate to outside of the battery, the method comprising:
    forming, on the surface of the positive electrode plate, at least one type selected from an oligomer of a compound containing a cyclohexyl group and a phenyl group, a polymer of a compound containing a cyclohexyl group and a phenyl group, a modified product of the oligomer of the compound containing a cyclohexyl group and a phenyl group, and a modified product of the polymer of the compound containing a cyclohexyl group and a phenyl group;

wherein the battery is able to work as a secondary battery; and wherein settings are adjusted so that the current cutoff mechanism in the nonaqueous electrolyte secondary battery operates at a pressure of 0.4 MPa to 1.5 MPa, and so that the time required for the operation of the current cutoff mechanism is within 1000 seconds from a start of a constant current charge of 4 C that is performed under an environment of −10° C. after the nonaqueous electrolyte secondary battery is set to a battery voltage of 4.1 V and a battery temperature of −10° C. after being charged.

* * * * *